United States Patent
Wang et al.

(10) Patent No.: US 8,606,465 B2
(45) Date of Patent: *Dec. 10, 2013

(54) PERFORMANCE-BASED CLASSIFICATION METHOD AND ALGORITHM FOR DRIVERS

(75) Inventors: Jenne-Tai Wang, Rochester, MI (US); Mark O. Neal, Rochester, MI (US); Chin-Hsu Lin, Troy, MI (US); Bing Deng, Shanghai (CN); Dorel M. Sala, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 705 days.

This patent is subject to a terminal disclaimer.

(21) Appl. No.: 12/604,595

(22) Filed: Oct. 23, 2009

(65) Prior Publication Data

US 2010/0121535 A1 May 13, 2010

Related U.S. Application Data

(60) Provisional application No. 61/113,900, filed on Nov. 12, 2008.

(51) Int. Cl.
  *B60R 22/00* (2006.01)
  *E05F 15/00* (2006.01)
  *G05D 1/00* (2006.01)

(52) U.S. Cl.
  USPC .................................................. 701/45; 701/1

(58) Field of Classification Search
  USPC ..................... 701/1, 36, 45, 48, 49; 702/173
  See application file for complete search history.

(56) References Cited

U.S. PATENT DOCUMENTS

| | | | | |
|---|---|---|---|---|
| 5,413,378 A | * | 5/1995 | Steffens et al. | 280/735 |
| 5,536,059 A | * | 7/1996 | Amirouche | 296/65.02 |
| 5,670,853 A | * | 9/1997 | Bauer | 318/286 |
| 6,000,717 A | * | 12/1999 | Rayford | 280/735 |
| 6,078,854 A | * | 6/2000 | Breed et al. | 701/49 |
| 6,081,757 A | * | 6/2000 | Breed et al. | 701/45 |
| 6,240,352 B1 | * | 5/2001 | McCurdy | 701/45 |
| 6,253,134 B1 | * | 6/2001 | Breed et al. | 701/49 |
| 6,330,501 B1 | * | 12/2001 | Breed et al. | 701/49 |

(Continued)

FOREIGN PATENT DOCUMENTS

DE      10 2006 019 712 B4      3/2008

OTHER PUBLICATIONS

Norin et al, combining accident data and laboratory simulation data reduces the risk for sub-optimized safety systems in cars, Nov. 1994, safety science 19 (1995) 57-69.*

*Primary Examiner* — Bhavesh V Amin
(74) *Attorney, Agent, or Firm* — John A. Miller; Miller IP Group, PLC

(57) ABSTRACT

A system and method for classifying the optimization of safety features on a vehicle for a driver of the vehicle based on the height and mass of the driver. The method includes determining a number of basic driver sizes based on driver height and mass and determining a driver's seat position for each basic driver height. The method also identifies a set of tunable design variables that are used to adjust the safety features of the vehicle and performs design optimization analysis to identify an optimal design for the vehicle safety features for each of the basic driver sizes. The method then identifies the design from the optimal designs that provides the best performance for randomly selected reference drivers and classifies all drivers into a predetermined number of classifications where each classification represents a particular optimal design.

20 Claims, 10 Drawing Sheets

(56) References Cited

U.S. PATENT DOCUMENTS

| | | | |
|---|---|---|---|
| 6,442,504 B1 * | 8/2002 | Breed et al. | 702/173 |
| 6,563,952 B1 * | 5/2003 | Srivastava et al. | 382/225 |
| 6,636,792 B2 * | 10/2003 | Lichtinger et al. | 701/45 |
| 6,675,080 B2 * | 1/2004 | Winkler | 701/45 |
| 6,682,095 B2 * | 1/2004 | Roychoudhury et al. | 280/735 |
| 6,823,959 B2 * | 11/2004 | Winkler et al. | 180/271 |
| 7,676,311 B2 * | 3/2010 | Baur et al. | 701/45 |
| 2003/0196495 A1 | 10/2003 | Saunders et al. | |
| 2005/0001411 A1 | 1/2005 | Theiss et al. | |
| 2005/0197754 A1 | 9/2005 | Bettwieser et al. | |
| 2006/0250016 A1 * | 11/2006 | Wang et al. | 297/408 |
| 2007/0182140 A1 * | 8/2007 | Baur et al. | 280/735 |
| 2008/0228358 A1 * | 9/2008 | Wang et al. | 701/49 |
| 2010/0121535 A1 * | 5/2010 | Wang et al. | 701/45 |
| 2010/0121536 A1 * | 5/2010 | Wang et al. | 701/45 |
| 2012/0053793 A1 * | 3/2012 | Sala et al. | 701/45 |
| 2012/0053794 A1 * | 3/2012 | Alcazar et al. | 701/48 |
| 2012/0078472 A1 * | 3/2012 | Neal et al. | 701/45 |

* cited by examiner

PERFORMANCE-BASED CLASSIFICATION METHOD AND ALGORITHM FOR DRIVERS

CROSS-REFERENCE TO RELATED APPLICATIONS

This application claims the benefit of the filing date of U.S. Provisional Application Ser. No. 61/113,900, titled Performance-Based Classification Method and Algorithm for Drivers, filed Nov. 12, 2008.

BACKGROUND OF THE INVENTION

1. Field of the Invention

This invention relates generally to a system and method for classifying drivers by relating driver body sizes to the best possible crash safety performance that could be provided by a select set of driver protection designs, and more particularly to a system and method for classifying drivers by relating body height and mass information to the best possible crash safety performance. A control algorithm is also proposed using the method to enable a vehicle to automatically select the best driver protection design for individual drivers.

2. Discussion of the Related Art

Modern vehicles often include systems for automatically setting various components and features in the vehicle for a particular vehicle driver and/or passenger, many of which are based on the size of the driver and the personal preferences of the driver. Particularly, modern vehicles are generally designed to allow persons of varying sizes and preferences to adjust features of vehicle systems for each person's comfort, convenience and operation needs. These vehicle features can include vehicle seats, foot pedals, rear-view mirrors, steering columns, etc. To reduce the burden of readjusting the selected features of a vehicle, some vehicles employ a memory system that stores the preferred settings for one or more users that is configured to automatically adjust the vehicle systems to the preferred settings upon request.

Modern vehicles also include a number of safety devices that protect the vehicle occupants during a crash event, such as airbag systems and seatbelt systems. Vehicle airbag systems are complex systems that are designed to protect the vehicle occupants. For example, airbag systems need to be designed so that they are not activated unless the crash event is significant enough, they are not activated unless the crash event is from the proper direction, the airbag is deployed fast enough during the crash event, the airbag is filled with enough gas to protect the vehicle occupant during the crash event and the airbag is properly vented so that the gas can escape from the airbag with the proper flow rate when the vehicle occupant is forced against the airbag so as dissipate the kinetic energy of the occupant without causing high rebound speed.

Vehicle seatbelt systems may be also equipped with a load-limiter that limits the load on the seatbelt so that it provides proper restraint forces to protect the belted occupant in a crash event. Particularly, during a crash event where the seatbelt wearer may be forced into the seatbelt with high inertia force, the load-limiter allows the seatbelt to extend or give a certain amount so that the seatbelt force during the event is high enough to provide the needed restraint, but not to cause injury to the wearer.

Typically, the airbag filling and venting rate, the seatbelt load-limiter tension and other safety features in the vehicle are set for an "average" person and may not be optimized for persons of lower weights and sizes and persons of higher weights and sizes. Therefore, it would be ideal to provide a system and method that personalizes the driver safety features on a vehicle for different individuals that can be set and stored much in the same way as other vehicle features.

Practically, it may be desirable to provide a classification system and method that personalizes the driver safety features on a vehicle to only a finite set of classes for different clusters of individuals that can be set and stored much in the same way as the other vehicle features referred to above.

SUMMARY OF THE INVENTION

In accordance with the teachings of the present invention, a system and method are disclosed for classifying the optimization of safety features on a vehicle for a driver of the vehicle based on the height and mass of the driver. The method includes determining a number of basic driver sizes based on driver height and mass and determining a driver's seat position for each basic driver height. The method also identifies a set of tunable design variables that are used to adjust the safety features of the vehicle and performs design optimization analysis to identify an optimal design for the vehicle safety features for each of the basic driver sizes. The method also produces a predetermined number of randomly selected reference driver's and performs design optimization analysis for identifying optimal design variables for the vehicle safety features for the randomly selected reference drivers. The method then identifies the design from the optimal designs that provides the best performance for each of the randomly selected reference drivers and classifies all drivers into a predetermined number of classifications where each classification represents a particular optimal design. The method then sets the vehicle safety features for a particular vehicle driver based on the driver's height and mass using the classification and optimal designs.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for classifying and optimizing safety features of a vehicle based on driver weight and height is merely exemplary in nature, and is in no way intended to limit the invention or its applications or uses.

Figure 1:
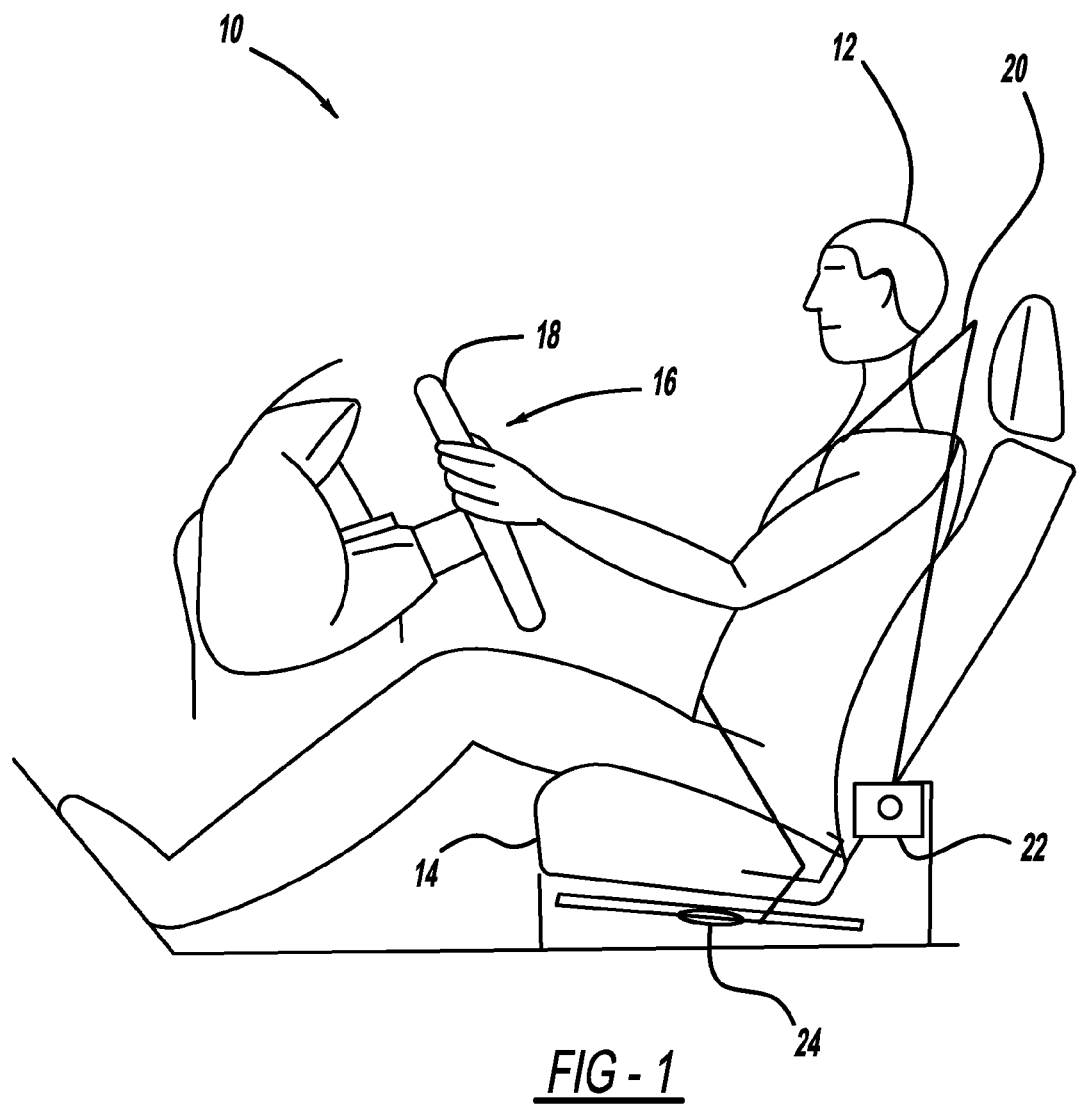
FIG. 1 is a side plan view of a vehicle driver in a driver seat of a vehicle.

FIG. 1 is a side plan view of the driver seat area 10 of a vehicle showing a driver 12 sitting in a driver's seat 14. The vehicle includes a driver airbag system 16 typically mounted within a steering wheel 18 of the vehicle. The driver's seat 14 includes a seatbelt 20 having a load-limiter 22 of the type discussed above. The vehicle seat 14 also includes a seat positioner 24 that positions the seat 14 forward and backward in the seat area 10.

Figure 2:
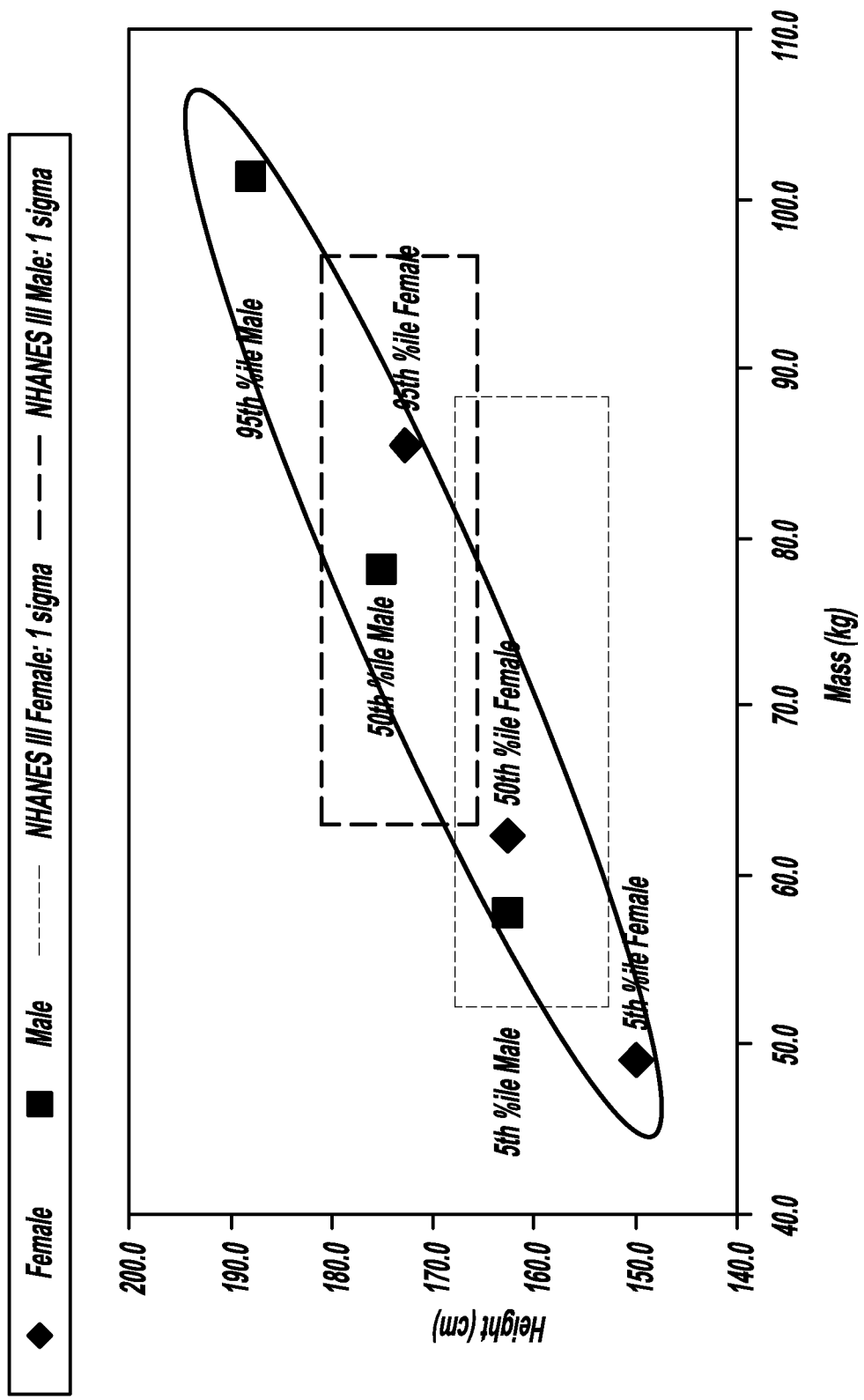
FIG. 2 is a graph with mass on the horizontal axis and height on the vertical axis showing a classification process for different size individuals.

The present invention proposes a process for classifying vehicle drivers and/or passengers so that vehicle safety systems, such as airbag deployment sensing time delay and vent size and seatbelt load-limiter force level, are optimized for a particular individual. In one embodiment, the process first identifies body measures of a vehicle occupant, the driver in this case, that are crucial to an outcome of a crash event. In the discussion below, these body measures are occupant height and mass, which can be obtained in any suitable manner. Next the process determines the number of basic occupant sizes n from a distribution of population sizes using the body measures. The driver population distribution of each gender can be provided by statistics data collected by the National Health and Nutrition Examination Survey (NHANES). In one non-limiting embodiment, the method chooses four basic occupant sizes n based on body height and mass, particularly a 5$^{th}$ percentile female (F5), a 50$^{th}$ percentile female (F50), a 50$^{th}$ percentile male (M50) and a 95$^{th}$ percentile male (M95). FIG. 2 is a graph with mass on the horizontal axis and height on the vertical axis showing the distribution of individuals for these basic sizes based on height and mass.

The process then creates occupant crash models for each selected basic occupant size n.

The process then determines the seating position for each basic occupant size n based on his or her standing height and vehicle design data by assuming a drivers seating position is approximately proportional to his/her height.

Figure 3:
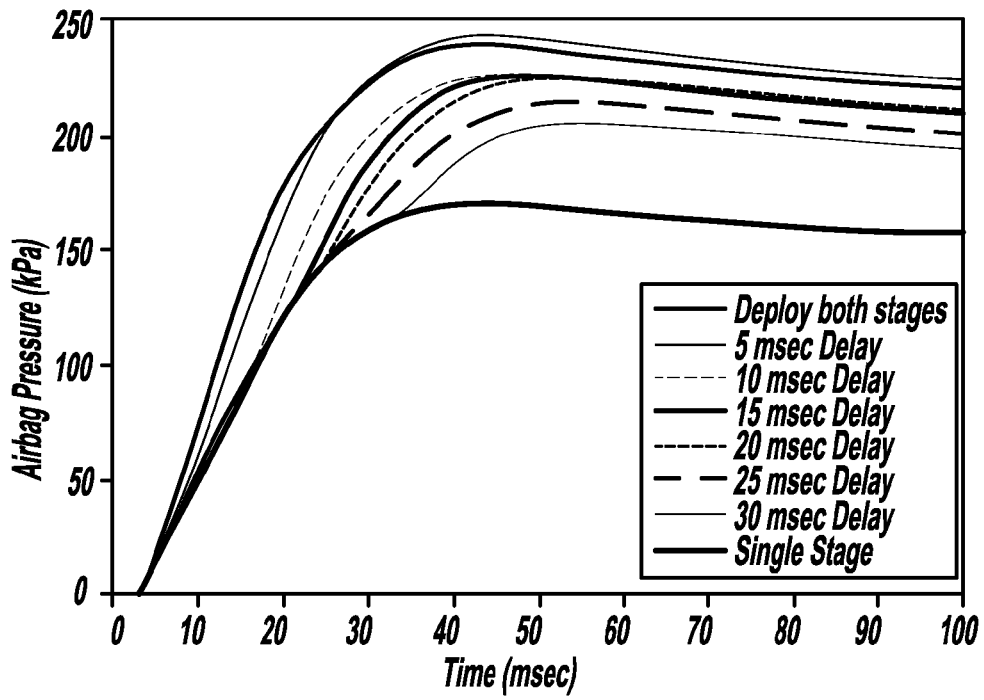
FIG. 3 is a graph with time on the horizontal axis and airbag pressure on the vertical axis showing graph lines for different vent sizes and time delay durations of a vehicle airbag.
Figure 4:
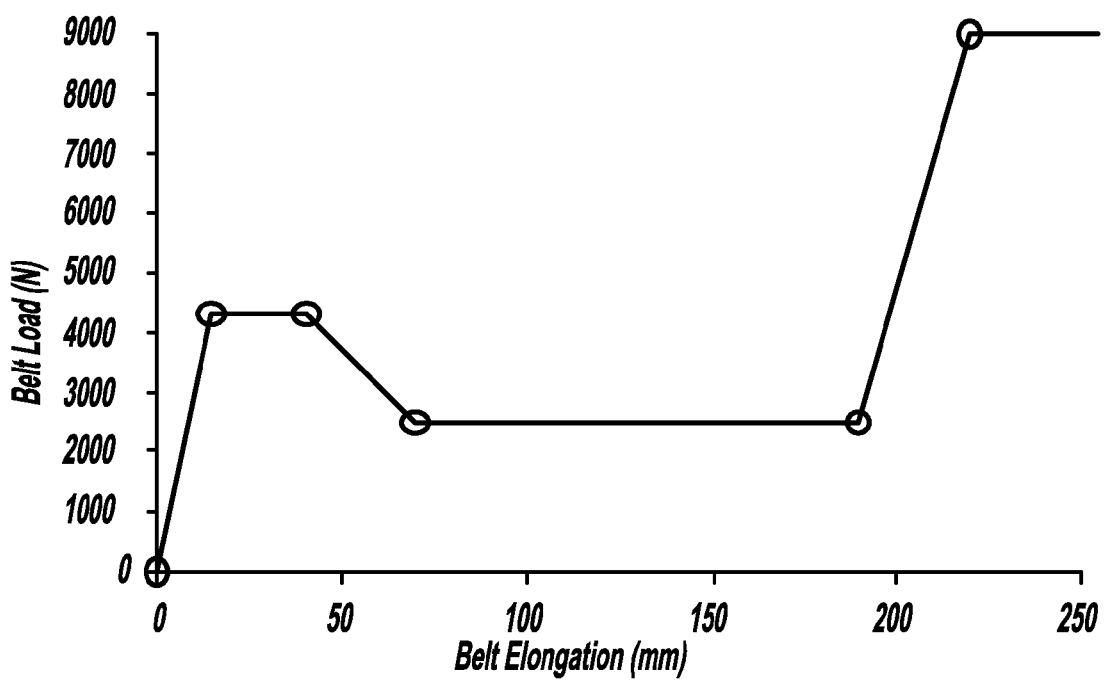
FIG. 4 is a graph with belt elongation on the horizontal axis and belt load on the vertical axis showing a response for a seatbelt load-limiter.

The process then chooses a set of dynamical tunable design variables for each particular occupant protection system, such as airbag vent size, the time delay duration between the first and second stages of the driver side airbag and seatbelt load-limiter force level. FIG. 3 is a graph with time on the horizontal axis and airbag pressure on the vertical axis showing the deployment of the airbag system 16 for different time delays. FIG. 4 is a graph with length on the horizontal axis and seatbelt load on the vertical axis showing seatbelt elongation for different seatbelt loads as provided by the load-limiter 22.

Figure 5:
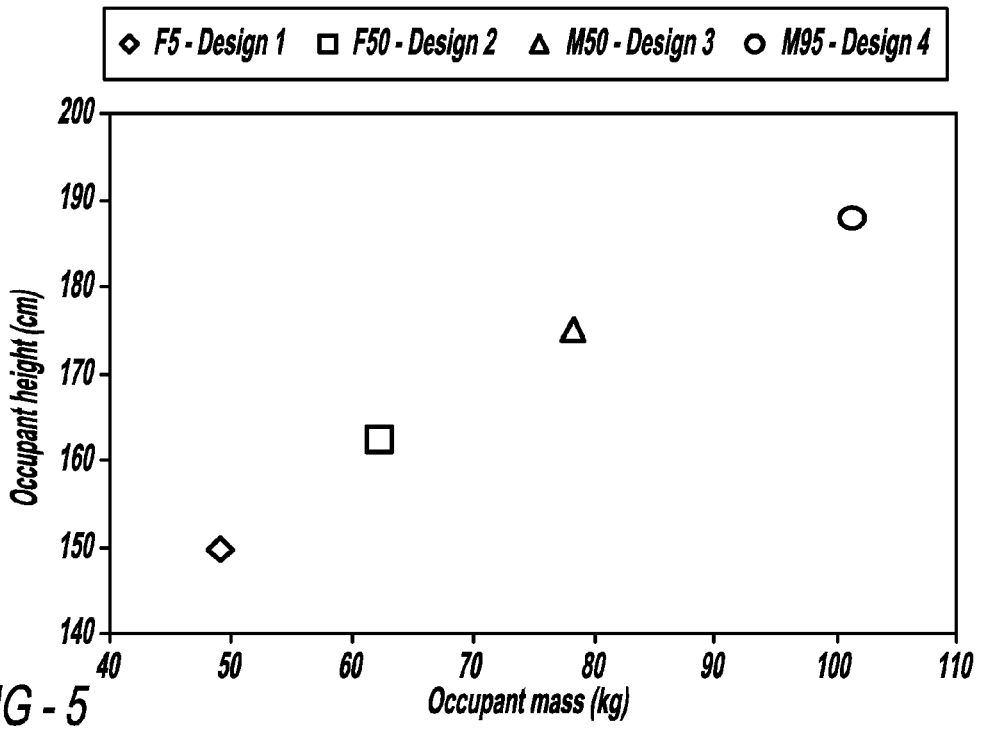
FIG. 5 is a graph with occupant mass on the horizontal axis and occupant height on the vertical axis showing the location for optimal design classifications for a $5^{th}$ percentile female, a $50^{th}$ percentile female, a $50^{th}$ percentile male and a $95^{th}$ percentile male.

The process then performs design optimization analysis and identifies the basic optimal design for each basic occupant size n. Table I below shows resultant data for basic optimal designs 1-4 representing classification F5, F50, M50 and M95, respectively, and FIG. 5 is a graph with occupant mass on the horizontal axis and occupant height on the vertical axis showing the relative location for each design classification F5, F50, M50 and M95.

TABLE I

| Optimal Design | AirbagVent (multiplier) | 2$^{nd}$ Stage Delay (msec) | Seat Belt Load Limiter (kN) | Occupant Size |
|---|---|---|---|---|
| 1 | 7.2 | 5 | 2300 | F5 |
| 2 | 7.1 | 10 | 3500 | F50 |
| 3 | 6.9 | 10 | 4400 | M50 |
| 4 | 5.0 | 25 | 6000 | M95 |

Figure 6:
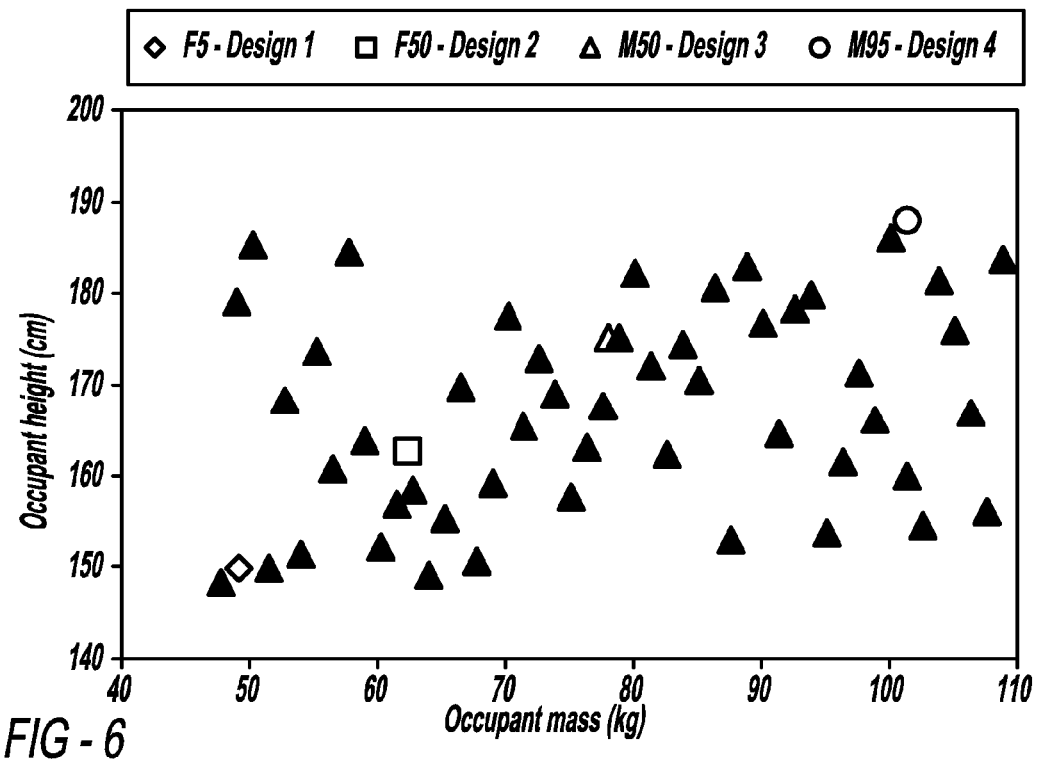
FIG. 6 is a graph with occupant mass on the horizontal axis and occupant height on the vertical axis showing fifty randomly selected individuals.

The algorithm then selects M random reference occupants that represent the occupant population. In one non-limiting embodiment, the number of reference occupants selected is fifty. Crash models are created for each reference occupant size and performance analysis is conducted using the noptimal designs. FIG. 6 is a graph with occupant mass on the horizontal axis and occupant height on the vertical axis showing the fifty random occupant sizes relative to the design classifications F5, F50, M50 and M95.

Figure 7:
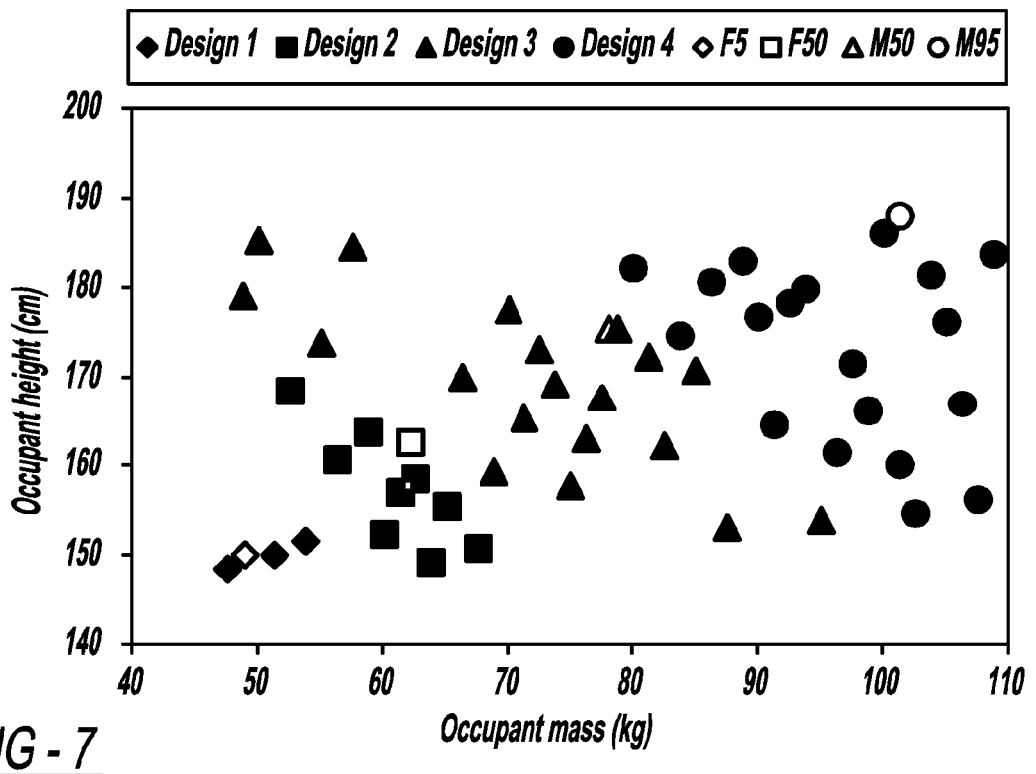
FIG. 7 is a graph with occupant mass on the horizontal axis and occupant height on the vertical axis showing the fifty randomly selected individuals in the graph of FIG. 6 as classified by the classifications shown in FIG. 5.

The process then identifies which design out of the four optimal designs best fits each of the M reference occupant sizes. FIG. 7 is a graph with occupant mass on the horizontal axis and occupant height on the vertical axis showing how the different reference occupant sizes are categorized into the particular optimal design.

Figure 8:
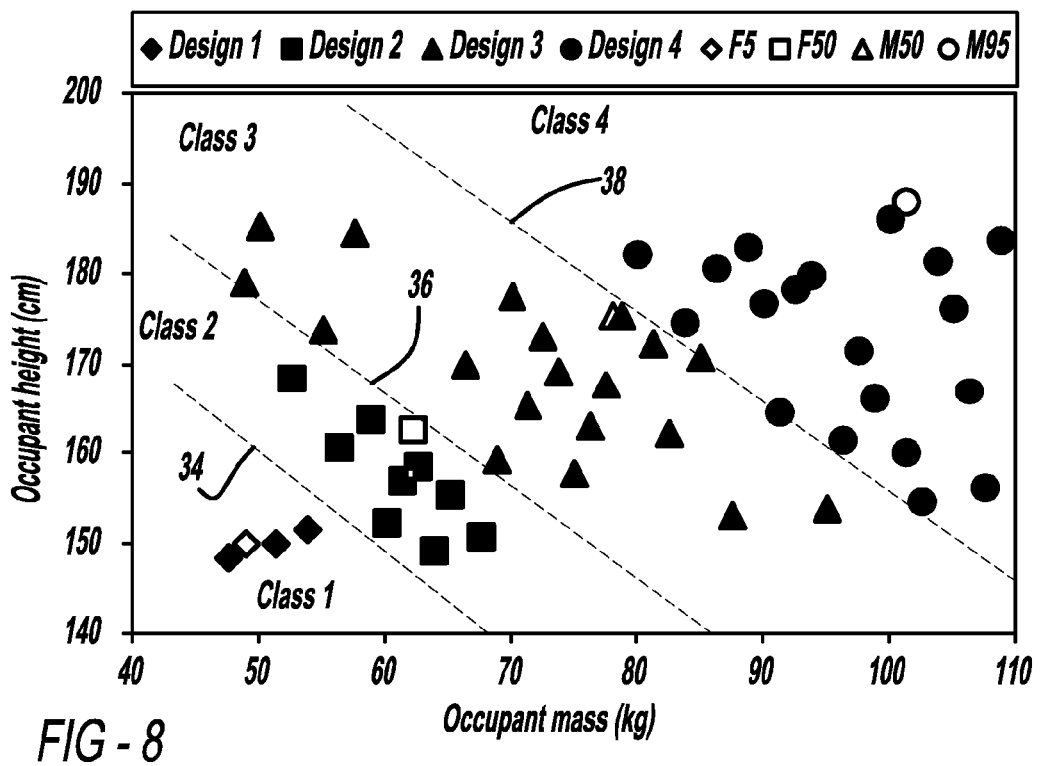
FIG. 8 is a graph with occupant mass on the horizontal axis and occupant height on the vertical axis showing threshold lines for classifying the data points of the individuals into the four classes.

The process then classifies the reference occupant sizes into the n body classes. FIG. 8 is a graph with occupant mass on the horizontal axis and occupant height on the vertical axis showing the classification of the reference occupants shown in FIG. 6. In this classification, class 1 is for basic optimal design 1, class 2 is for basic optimal design 2, class 3 is for basic optimal design 3 and class 4 is for design 4.

In FIG. 8, a threshold line 34 separates class 1 from class 2, a threshold line 36 separates class 2 from class 3 and a threshold line 38 separates class 3 from class 4. In order to determine which classification a new driver fits into, the threshold lines 34, 36 and 38 can be defined by the following equations.

$$b_1 = -m_1 x + y \quad (1)$$

$$b_2 = -m_2 x + y \quad (2)$$

$$b_3 = -m_3 x + y \quad (3)$$

Where x and y are the driver's body mass and height, respectively, and $m_1$, $m_2$ and $m_3$ are the slope of the threshold lines

34, 36 and 38, respectively. For this non-limiting example, $b_1=211$, $b_2=226$, $b_3=257$ and $m_1=m_2=m_3=-1$.

Figure 9:
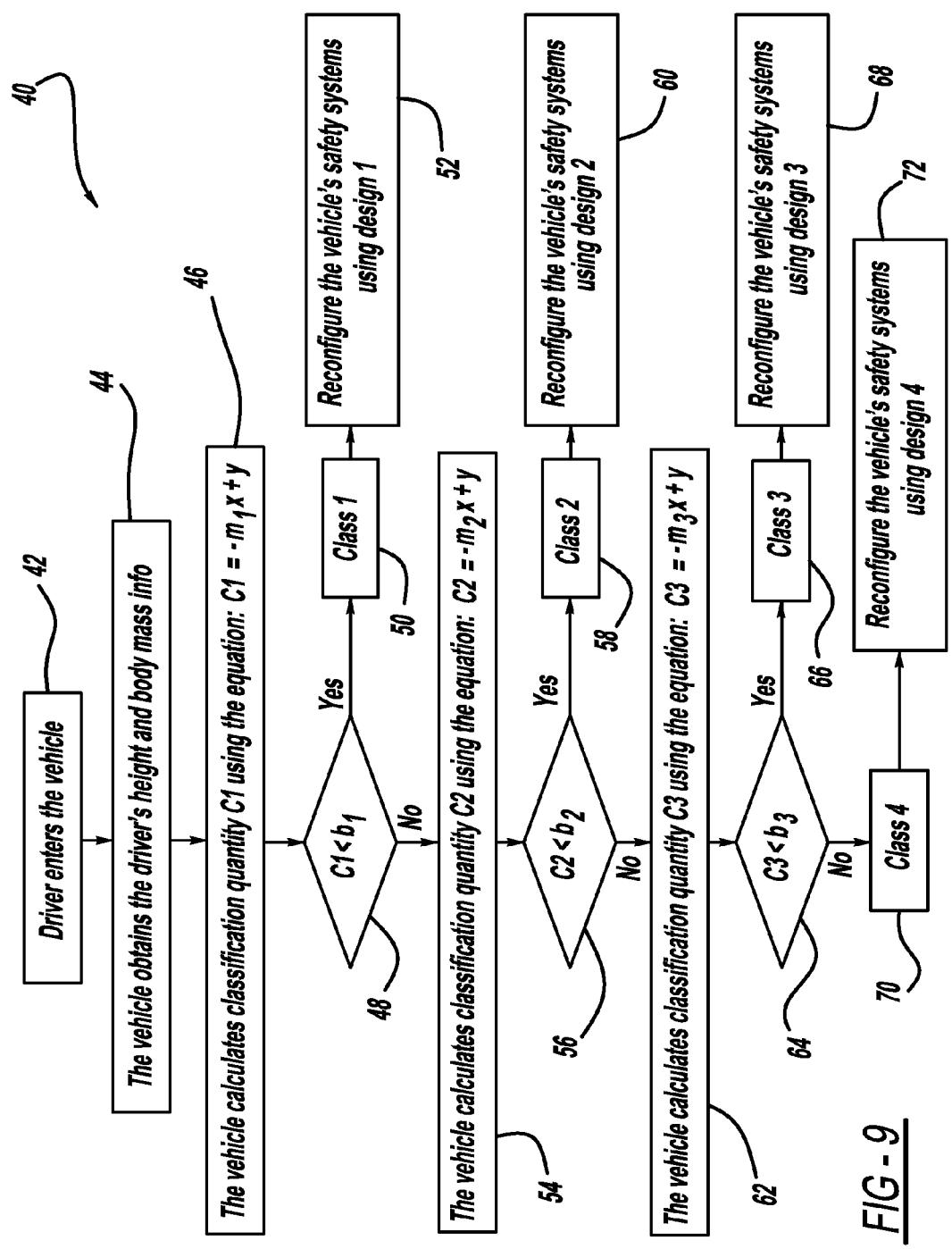
FIG. 9 is a flow chart diagram showing a process for selecting the proper safety feature design for a particular driver of a vehicle.

FIG. 9 is a flow chart diagram 40 showing a performance-based driver classification algorithm for a vehicle with individual safety systems, using the classification discussed above. The algorithm first determines whether a driver has entered the vehicle at box 42 by any suitable technique. When the driver enters the vehicle, the algorithm obtains the driver's height and body mass information at box 44 by any suitable technique, such as having the vehicle driver specifically input the information.

The algorithm then calculates a classification quantity C1 for class 1 using equation (1) at box 46, where $C1=-m_1x+y$. The algorithm then determines whether the classification quantity C1 is less than the threshold value $b_1$ at decision diamond 48, and if it is, meaning that the classification quantity C1 is less than or equal to the value $b_1$, the algorithm determines that the driver is a class 1 driver at box 50. The algorithm then reconfigures the vehicle safety systems using basic optimal design 1 at box 52.

If the classification quantity C1 is not less than the threshold value $b_1$ at the decision diamond 48, the algorithm calculates a classification quantity C2 using equation (2) at box 54, where $C2=-m_2x+y$. The algorithm then determines whether the classification quantity C2 is less than the threshold value $b_2$ at decision diamond 56, and if it is, meaning that the classification quantity C2 is between the values $b_1$ and $b_2$, the algorithm determines that the driver is a class 2 driver at box 58. The algorithm then reconfigures the vehicle safety systems using basic optimal design 2 at box 60.

If the algorithm determines that the classification quantity C2 is not less than the threshold value $b_2$ at the decision diamond 56, then the algorithm calculates a classification quantity C3 using equation (3) at box 52, where $C3=-m_3x+y$. The algorithm then determines whether the classification quantity C3 is less than the threshold value $b_3$ at decision diamond 64, and if it is, meaning that the classification quantity C3 is between the values $b_2$ and $b_3$, the algorithm determines that the driver is a class 3 driver at box 66. The algorithm then reconfigures the vehicle safety systems using basic optimal design 3 at box 68.

If the algorithm determines that the classification quantity C3 is not less than the threshold value $b_3$ at the decision diamond 54, the algorithm determines that the driver is a class 4 driver at box 70 and sets the vehicle safety systems using basic optimal design 4 at box 72.

The technique discussed above for determining safety system settings for the vehicle driver assumes that the driver will set the position of the seat 14 based on his/her height, and thus the classification designs for the safety systems will be set accordingly. For a vehicle occupant in the passenger seat of the vehicle, the passenger seat may not be set according to the passenger's height for various reasons, such as a tall person sitting in the back seat behind them. Therefore, determining the optimal safety feature settings for a vehicle occupant in the passenger seat requires a different analysis to that of the driver discussed above. In one embodiment, the size of the passenger is determined by the position of the seat and the body mass index (BMI) of the passenger, which is body mass divided by body height squared. The process for determining the classifications for the safety feature settings, and then determining which class the passenger falls under is as follows.

The process first identifies the desired body measures of a passenger, which are body height and body mass. The process then chooses the total number of basic occupant sizes n, which is the same as for the driver discussed above, with consideration of the distribution of population sizes using the body measures. The process then determines the number of selected seat positions L, such as three, forward, mid and rearward.

The process then creates occupant crash models for each basic occupant size n at each selected seat position L. In one non-limiting embodiment, twelve designs are provided based on four basic occupant sizes n and the three seat positions L. The twelve designs include a forward seat position for a $5^{th}$ percentile female (F5 forward), a mid-seat position for a $5^{th}$ percentile female (F5 mid), a rearward seat position for a $5^{th}$ percentile female (F5 rearward), a forward seat position for a $50^{th}$ percentile female (F50 forward), a mid-seat position for a $50^{th}$ percentile female (F50 mid), a rearward seat position for a $50^{th}$ percentile female (F50 rearward), a forward seat position for a $50^{th}$ percentile male (M50 forward), a mid-seat position for a $50^{th}$ percentile male (M50 mid), a rearward seat position for a $50^{th}$ percentile male (M50 rearward), a forward seat position for a $95^{th}$ percentile male (M95 forward), a mid-seat position for a $95^{th}$ percentile male (M95 mid) and a rearward position for a $95^{th}$ percentile male (M95 rearward).

The process then performs design optimization analysis and identifies the optimal design for each basic occupant size n at each seat position L, called basic optimal designs hereon. The process chooses a set of dynamical design variables of the occupant protection system, such as airbag vent size and the time delay between the first and second stages of the passenger's side airbag, and seatbelt load-limiter force level. Table II below shows one set of results of the optimization analysis for the twelve optimal designs for airbag vent position, $2^{nd}$ stage airbag delay and seatbelt load-limiter force level.

TABLE II

| Optimal Design | Vent (multiplier) | Inflator $2^{nd}$ Stage Delay (msec) | Seat belt limiter (kN) | Occupant Size & Seating Position |
| --- | --- | --- | --- | --- |
| 1 | 2.62 | 10 | 2780 | F5 forward |
| 2 | 0 | Infinite | 2300 | F5 mid |
| 3 | 7.2 | Infinite | 2300 | F5 rearward |
| 4 | 1.92 | 20 | 3690 | F50 forward |
| 5 | 1.5 | 10 | 4010 | F50 mid |
| 6 | 1.21 | 10 | 4420 | F50 rearward |
| 7 | 2.04 | 30 | 2310 | M50 forward |
| 8 | 2.85 | 30 | 4880 | M50 mid |
| 9 | 2.62 | 30 | 5180 | M50 rearward |
| 10 | 2.27 | 25 | 5810 | M95 forward |
| 11 | 2.17 | 25 | 5950 | M95 mid |
| 12 | 1.59 | 5 | 5980 | M95 rearward |

The process then looks at the basic optimal designs and their crash performance results to consolidate or reduce the number of basic optimal designs to a smaller set, if possible. Table III shows that the twelve designs can be readily reduced to seven basic optimal designs, namely designs 4-6, 8-10, and 12.

TABLE III

| Optimal Design | Vent (multiplier) | Inflator $2^{nd}$ Stage Delay (msec) | Seat Belt limiter (kN) | Occupant Size & Seating Position |
| --- | --- | --- | --- | --- |
| 4 | 1.92 | 20 | 3690 | F50 forward |
| 5 | 1.5 | 10 | 4010 | F50 mid |
| 6 | 1.21 | 10 | 4420 | F50 rearward |
| 8 | 2.85 | 30 | 4880 | M50 mid |
| 9 | 2.62 | 30 | 5180 | M50 rearward |
| 10 | 2.27 | 25 | 5810 | M95 forward |
| 12 | 1.59 | 5 | 5980 | M95 rearward |

Figure 10:
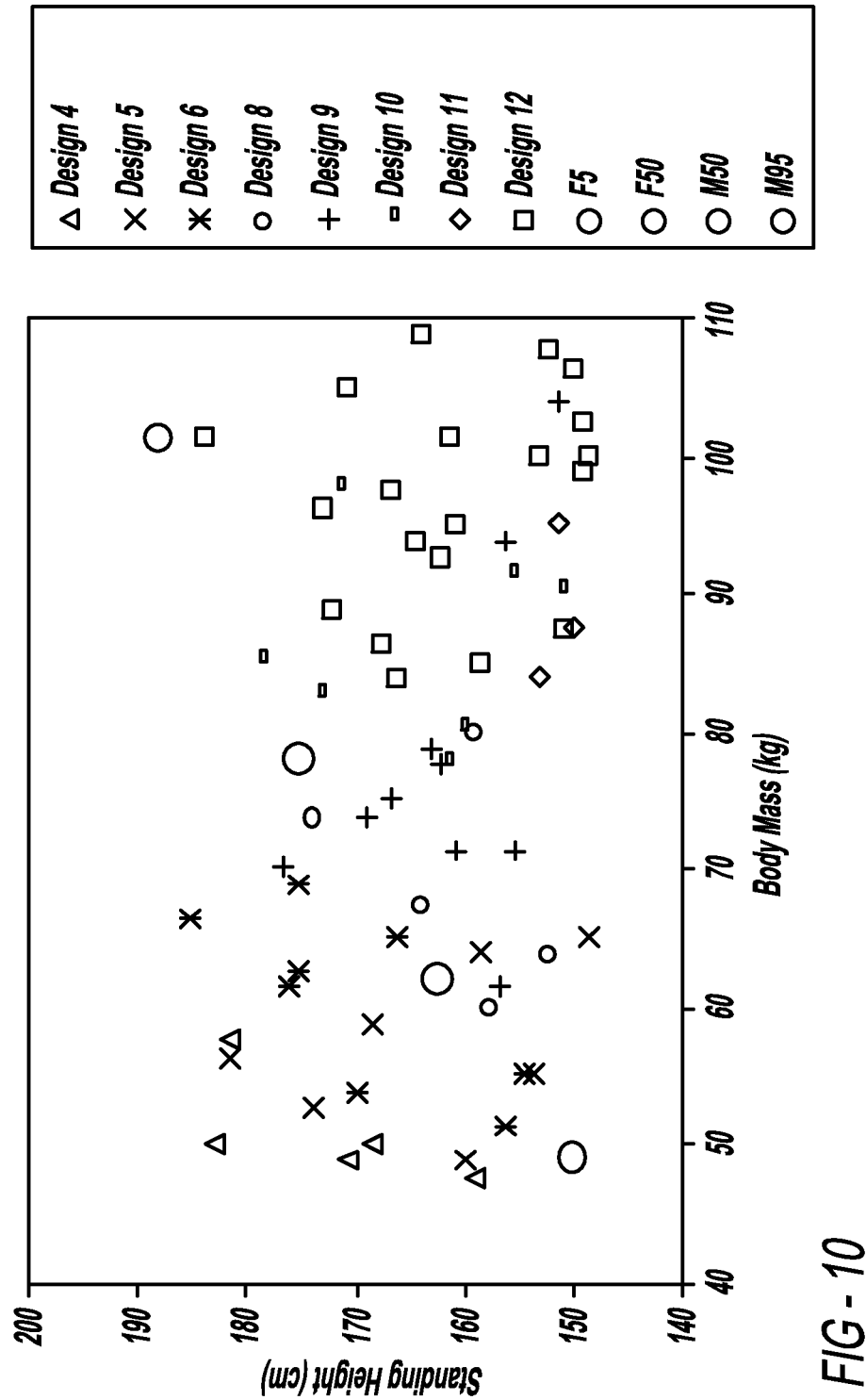
FIG. 10 is a graph with body mass on the horizontal axis and standing height on the vertical axis showing a number of data points for different individuals and a design group that they would fall into relative to a classification for a 5$^{th}$ percentile female, a 50$^{th}$ percentile female, a 50$^{th}$ percentile male and a 95$^{th}$ percentile male.

The process then determines a desired number of reference occupant sizes M and randomly selects the reference occupants as a reasonable distribution based on the real-world population. In one non-limiting embodiment, the number of reference occupants selected is sixty-five. The process randomly distributes the seating position of each reference occupant. FIG. 10 is a graph with body mass on the horizontal axis and standing height on the vertical axis showing distributions for the randomly selected occupants for the seven designs and four occupant sizes F5, F50, M50 and M95. Crash models are created for each reference occupant at a particular seating position and performance analysis is conducted using the basic optimal designs.

Figure 11:
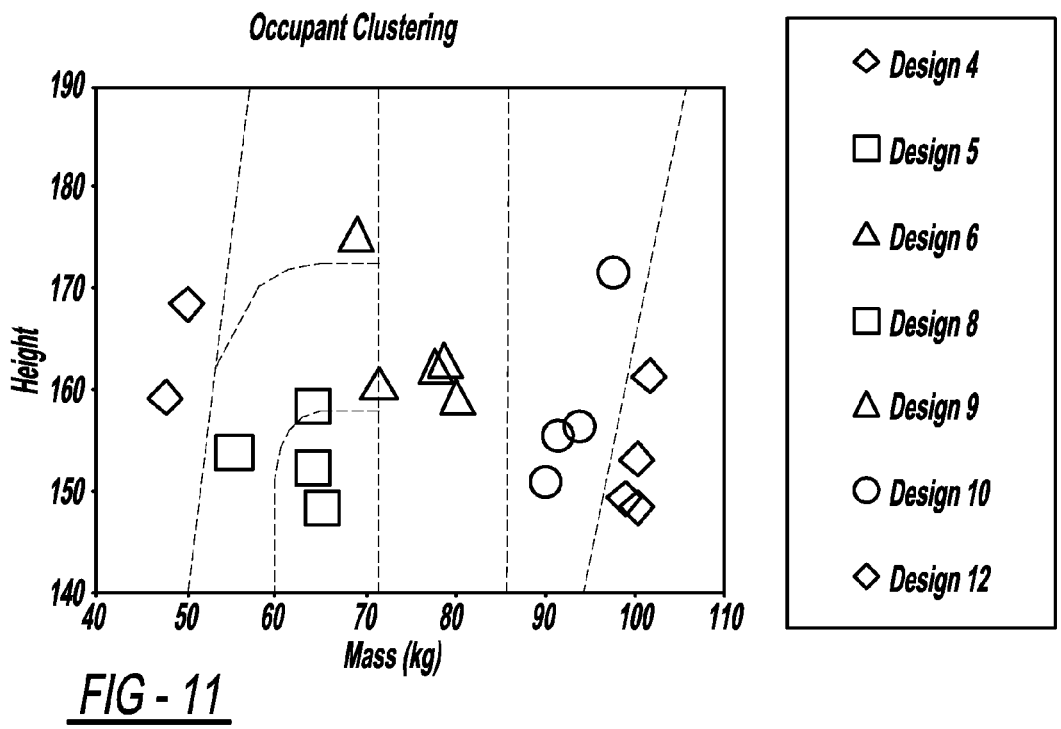
FIG. 11 is a graph with mass on the horizontal axis and height on the vertical axis showing data points of individuals falling within different design classifications for a particular seating position of a passenger seat of the vehicle.
Figure 12:
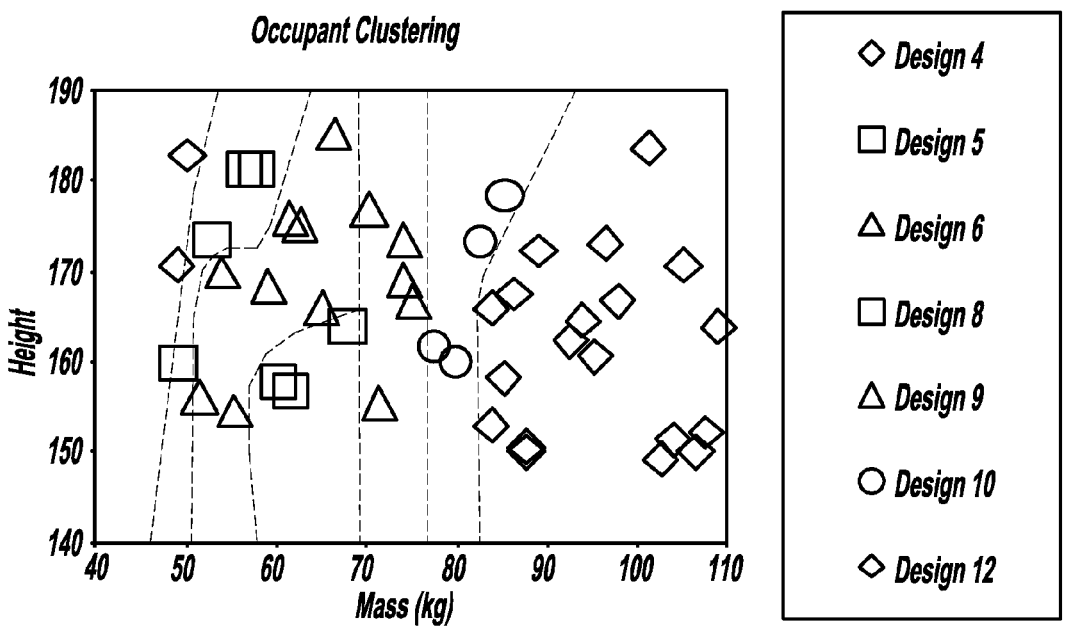
FIG. 12 is a graph with mass on the horizontal axis and height on the vertical axis showing the classification for the different individuals for another seating position of the passenger seat of the vehicle.

The process then identifies the design that yields the best performance out of the seven basic optimal designs for each reference occupant at the chosen seating position. FIGS. 11 and 12 are graphs with body mass on the horizontal axis and height on the vertical axis showing occupant clustering for the seven basic optimal designs for a seating zone 1 and a seating zone 2, respectively. Seating zone 1 is the seating zone before the mid-range of the entire seating position and seating zone 2 is the seating zone after the mid-range of the entire seating position.

Figure 13:
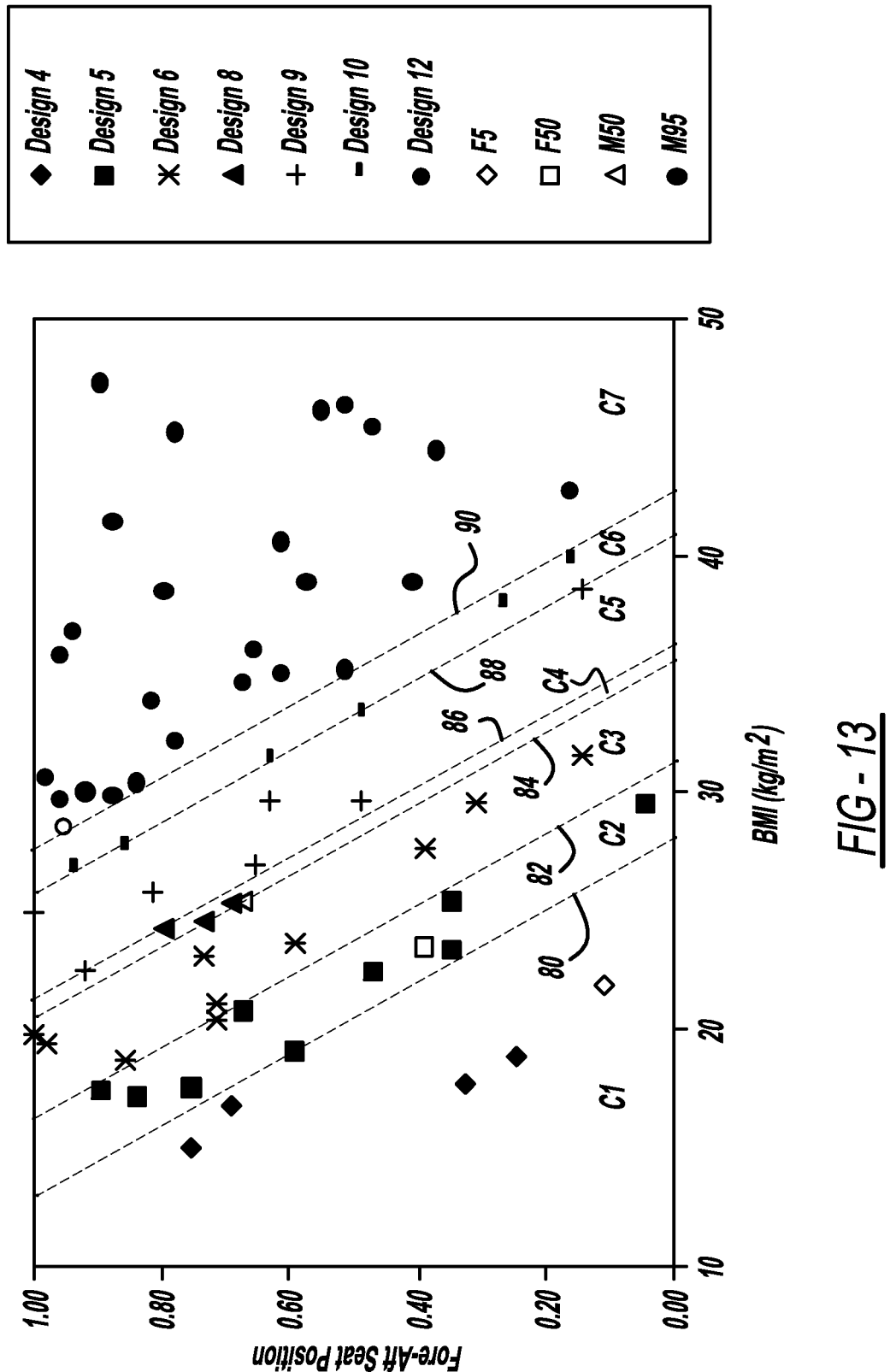
FIG. 13 is a graph with body mass index on the horizontal axis and seat position on the vertical axis showing seven design classifications relative to threshold lines for different individuals based on their body mass index and seat position.

The process then clusters the reference occupants at different seating positions with the same best optimal design. FIG. 13 is a graph with body mass index on the horizontal axis and seat position on the vertical axis showing the clustering of the reference occupants and the four occupant sizes for the seven basic optimal designs. This graph is used to provide classification C1, C2, C3, C4, C5, C6 and C7 that will set the optimal safety feature positions for the passenger. As above, a threshold line 80 separates class C1 from class C2, a threshold line 82 separates class C2 from class C3, a threshold line 84 separates class C3 from class C4, a threshold line 86 separates class C4 from class C5, a threshold line 88 separates class C5 from class C6 and a threshold line 90 separates class C6 from class C7. Threshold equations are determined for each class $C_1$-$C_7$ as:

$$b_1 = -m_1 x + y \quad (4)$$

$$b_2 = -m_2 x + y \quad (5)$$

$$b_3 = -m_3 x + y \quad (6)$$

$$b_4 = -m_4 x + y \quad (7)$$

$$b_5 = -m_5 x + y \quad (8)$$

$$b_6 = -m_6 x + y \quad (9)$$

Where x and y are the passenger's body mass index and the seating position, respectively, and $m_i$ is the slope of the threshold lines 80-90. In this embodiment, $b_1=1.833$, $b_2=2.067$, $b_3=2.347$, $b_4=2.427$, $b_5=2.713$, $b_6=2.833$ and $m_1=m_2=m_3=m_4=m_5=m_6=-0.067$.

Figure 14:
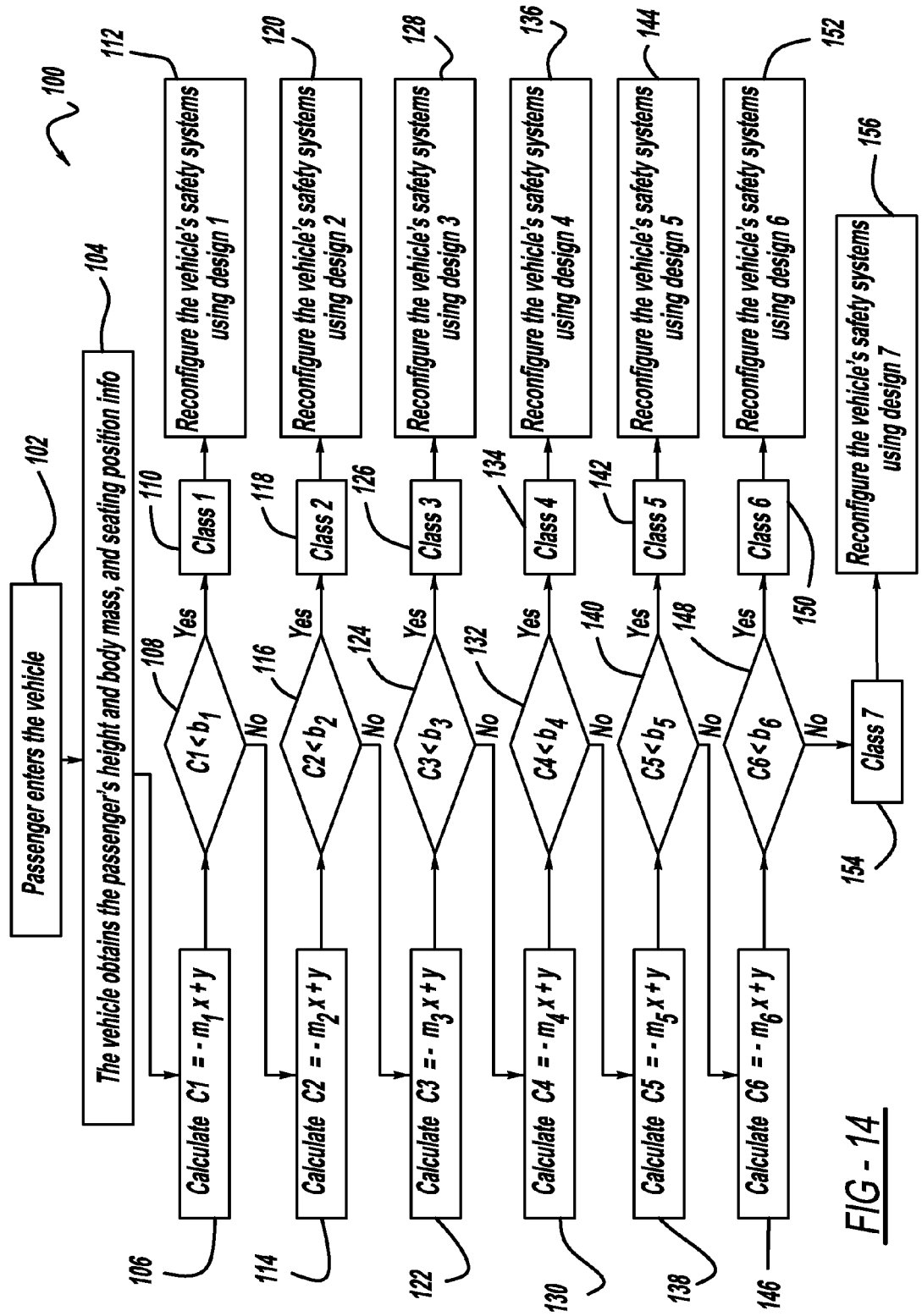
FIG. 14 is a flow chart diagram showing a process for selecting the design classification for a particular passenger.

Once the classifications C1-C7 are defined, an algorithm can be provided that sets the safety features for the passenger in the same manner as discussed above for the driver. FIG. 14 is a flow chart diagram 100 showing such an algorithm. At box 102, the algorithm determines whether a passenger has entered the vehicle. If a passenger has entered the vehicle at the box 102, the algorithm obtains the passengers height and body mass and determines the passenger seat position at box 104.

The algorithm then calculates the passenger's body mass index and classification quantity C1 using equation (4) at box 106, where $C1=-m_1 x+y$, and determines whether the classification quantity C1 is less than the threshold value $b_1$ at decision diamond 108. If the classification quantity C1 is less than the threshold value $b_1$ at the decision diamond 108, then the algorithm determines that the passenger is a class 1 passenger at box 110 and sets the vehicle safety systems for basic optimal design 1 at box 112.

If the classification quantity C1 is not less than the threshold value $b_1$ at the decision diamond 108, then the algorithm calculates the classification quantity C2 using equation (5) at box 114, where $C2=-m_2 x+y$, and determines whether the classification quantity C2 is less than the threshold value $b_2$ at decision diamond 116. If the classification quantity C2 is less than the threshold value $b_2$ at the decision diamond 116, meaning that the classification quantity C2 is between the threshold values $b_1$ and $b_2$, the algorithm determines that the passenger is a class 2 passenger at box 118 and reconfigures the vehicle safety systems using basic optimal design 2 at box 120.

If the classification quantity C2 is not less than the threshold value $b_2$ at the decision diamond 116, then the algorithm calculates the classification quantity C3 using equation (6) at box 122, where $C3=-m_3 x+y$, and determines whether the classification quantity C3 is less than the threshold value $b_3$ at decision diamond 124. If the classification quantity C3 is less than the value $b_3$ at the decision diamond 104, meaning that the classification quantity C3 is between the threshold values $b_2$ and $b_3$, then the algorithm determines that the passenger is a class 3 passenger at box 126 and reconfigures the vehicle safety systems using basic optimal design 3 at box 128.

If the algorithm determines that the classification quantity C3 is not less than the threshold value $b_3$ at the decision diamond 124, then the algorithm calculates the classification quantity C4 using equation (7) at box 130, where $C4=-m_4 x+y$, and determines whether the classification quantity C4 is less than the threshold value $b_4$ at decision diamond 132. If the classification quantity C4 is less than the threshold value $b_4$ at the decision diamond 132, meaning the classification quantity C4 is between the threshold values $b_3$ and $b_4$, then the algorithm determines that the passenger is a class 4 passenger at box 134 and reconfigures the vehicle safety systems using basic optimal design 4 at box 136.

If the algorithm determines that the classification quantity C4 is not less than the threshold value $b_4$ at the decision diamond 132, then the algorithm calculates the classification quantity C5 using equation (8) at box 138, where $C5=-m_5 x+y$, and determines whether the classification quantity C5 is less than the threshold value $b_5$ at decision diamond 140. If the classification quantity C5 is less than the threshold value $b_5$ at the decision diamond 140, meaning the classification quantity C4 is between the threshold values $b_3$ and $b_4$, then the algorithm determines that the passenger is a class 5 passenger at box 142 and reconfigures the vehicle safety systems using basic optimal design 5 at box 144.

If the algorithm determines that the classification quantity C5 is not less than the threshold value $b_5$ at the decision diamond 140, then the algorithm calculates the classification quantity C6 using equation (9) at box 146, where $C6=-m_6 x+y$, and determines whether the classification quantity C6 is less than the threshold value $b_6$ at decision diamond 148. If the classification quantity C6 is less than the threshold value $b_6$, meaning that the classification quantity C6 is between the threshold values $b_5$ and $b_6$, the algorithm determines that the passenger is a class 6 passenger at box 150 and sets the vehicle safety systems using basic optimal design 6 at box 152.

If the classification quantity C6 is not less than the threshold value $b_6$ at the decision diamond 148, then the algorithm determines that the passenger is a class 7 passenger at box 154 and sets the vehicle safety systems using design 7 at box 156.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for designing a vehicle to classify a vehicle driver for optimizing vehicle safety systems and devices for the driver, said method comprising:
   determining a number of basic driver sizes based on population distributions for each gender;
   determining a proper driver seat position for each basic driver size;
   identifying a set of tunable design variables that are used to adjust the vehicle safety systems and devices;
   performing design optimization analysis on the set of tunable design variables in a processor to identify a set of optimal designs for the vehicle safety systems and devices where each optimal design corresponds to a basic driver size;
   performing crash simulations on the processor for each optimal design from the set of optimal designs for a predetermined number of randomly selected reference drivers to produce crash simulation results;
   using the crash simulation results to identify the best optimal design from the set of optimal designs that provides the best performance for each of the randomly selected reference drivers;
   creating a predetermined number of driver classifications using the best optimal designs where each driver classification identifies a group of drivers that gets the best performance from a particular optimal design; and
   manufacturing a production vehicle so that the vehicle safety systems and devices are set to an optimal design for a particular vehicle driver based on the driver's size, where the driver's size includes height and mass using the driver classifications.

2. The method according to claim 1 wherein each driver size is determined by body mass and height.

3. The method according to claim 1 wherein the driver population distributions of each gender represents statistics data collected by a National Health and Nutrition Examination Survey (NHANES).

4. The method according to claim 1 further comprising providing occupant crash models for each basic driver size from which the design optimization analysis is performed.

5. The method according to claim 1 further comprising providing occupant crash models for the reference drivers from which the crash simulations are performed.

6. The method according to claim 1 wherein one of the vehicle safety systems is an airbag system and design variables for the airbag system include vent size and a time delay duration between first and second stages of airbag firing.

7. The method according to claim 1 wherein one of the vehicle safety devices is a seatbelt load-limiter and a design variable for the load-limiter sets the load-limiter tension.

8. The method according to claim 1 wherein the number of basic occupant sizes is four sizes and the number of classifications and designs is four.

9. The method according to claim 8 wherein the four sizes represent a $5^{th}$ percentile female, a $50^{th}$ percentile female, a $50^{th}$ percentile male and a $95^{th}$ percentile male.

10. The method according to 1 wherein classifying all driver's includes classifying the drivers based on a line defining a threshold where threshold lines separate each design classification in a reference system of body mass and body height.

11. The method according to claim 10 wherein classifying all drivers includes using an equation for each classification in the form of $b=-mx+y$, where b is a threshold value, m is the slope of the threshold line, x is the driver's body mass and y is the driver's body height.

12. The method according to claim 1 wherein setting the vehicle systems and devices for a particular vehicle driver includes determining a classification quantity based on the driver's height and body mass and determining where that classification quantity falls relative to the optimal designs.

13. The method according to claim 1 wherein the number of reference driver's is about fifty.

14. A method for designing a driver classification system for optimizing vehicle safety systems and devices for the driver, said method comprising:
   determining four basic driver sizes based on population distribution of each gender in terms of body height and mass;
   determining a proper driver seat position for each basic driver size;
   identifying a set of tunable design variables that are used to adjust the vehicle safety systems and devices;
   providing a basic occupant computer crash model for each basic driver size;
   performing design optimization analysis on the set of tunable design variables in a processor to identify four optimal designs for the vehicle safety systems and devices one for each of the four basic driver sizes using the basic occupant computer crash models;
   performing crash simulations on the processor with the four optimal designs using reference occupant crash models for a predetermined number of randomly selected reference drivers to produce crash simulation results;
   using the crash simulation results to identify the best optimal design from the four optimal designs that provides the best performance for each of the randomly selected reference drivers; and
   creating a predetermined number of driver classifications using the best optimal designs, where each driver classification identifies a group of drivers that gets the best performance from a particular optimal design.

15. The method according to claim 14 further comprising manufacturing a production vehicle so that the vehicle safety systems and devices for a particular vehicle driver based on the driver's height and mass using the classifications and four optimal designs.

16. The method according to claim 14 wherein one of the vehicle safety systems is an airbag system and design variables for the airbag system include vent size and a time delay duration between first and second stages of airbag firing and another one of the vehicle safety devices is a seatbelt load limiter and a design variable for the load-limiter sets the load-limiter tension.

17. The method according to claim 14 wherein the four basic sizes represent a $5^{th}$ percentile female, a $50^{th}$ percentile female, a $50^{th}$ percentile male and a $95^{th}$ percentile male.

18. The method according to 14 wherein classifying all drivers includes classifying the drivers based on a line defining a threshold where threshold lines separate each design classification.

19. The method according to claim 18 wherein classifying all drivers includes using an equation for each classification in the form of $b=-mx+y$, where b is a threshold value, m is the slope of the threshold line, x is the driver's body mass and y is the driver's body height.

20. The method according to claim 14 wherein setting the vehicle systems and devices for a particular vehicle driver includes determining a classification quantity based on the driver's height and body mass and determining where that classification quantity falls relative to the optimal design.

* * * * *